US008943108B2

(12) United States Patent
Allen et al.

(10) Patent No.: US 8,943,108 B2
(45) Date of Patent: Jan. 27, 2015

(54) HARDWARE OFF-LOAD MEMORY GARBAGE COLLECTION ACCELERATION

(75) Inventors: Joseph H. Allen, Belmont, MA (US); Moshe M. E. Matsa, Cambridge, MA (US); David Z. Maze, Somerville, MA (US); Jeffrey M. Peters, Leominster, MA (US)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 12/645,514

(22) Filed: Dec. 23, 2009

(65) Prior Publication Data

US 2011/0153690 A1   Jun. 23, 2011

(51) Int. Cl.
*G06F 17/30* (2006.01)
*G06F 12/02* (2006.01)

(52) U.S. Cl.
CPC ................................. *G06F 12/0269* (2013.01)
USPC .................................. 707/813; 711/E12.011

(58) Field of Classification Search
CPC . G06F 12/02; G06F 12/0253; G06F 2212/70; G06F 11/073; G06F 2009/45583
USPC ........................... 707/813, 814, 816, 999.206; 711/E12.011
See application file for complete search history.

(56) References Cited

U.S. PATENT DOCUMENTS

| | | | |
|---|---|---|---|
| 5,450,542 A * | 9/1995 | Lehman et al. | 345/542 |
| 6,336,180 B1 * | 1/2002 | Long et al. | 712/34 |
| 6,434,137 B1 * | 8/2002 | Anderson et al. | 370/347 |
| 6,473,777 B1 * | 10/2002 | Hendler et al. | 1/1 |
| 6,604,182 B1 | 8/2003 | Sexton et al. | |
| 6,920,541 B2 | 7/2005 | Kolodner et al. | |
| 6,950,837 B2 | 9/2005 | Subramoney et al. | |
| 7,043,623 B2 * | 5/2006 | Chen et al. | 711/219 |
| 7,069,279 B1 | 6/2006 | Rau et al. | |
| 7,200,741 B1 * | 4/2007 | Mine | 712/244 |
| 7,228,543 B2 | 6/2007 | Baylis | |
| 7,302,544 B2 | 11/2007 | Chung et al. | |
| 7,412,580 B1 | 8/2008 | Garthwaite | |
| 7,822,938 B2 | 10/2010 | Dussud et al. | |
| 2003/0196061 A1 | 10/2003 | Kawahara et al. | |

(Continued)

OTHER PUBLICATIONS

Cell GC: using the cell synergistic processor as a garbage collection coprocessor Authors: Chen-Yong Cher IBM T J Watson Research Center, Yorktown Heights, NY Michael Gschwind IBM T J Watson Research Center, Yorktown Heights, NY VEE '08 Proceedings of the fourth ACM SIGPLAN/SIGOPS international conference on Virtual execution environments.*

(Continued)

*Primary Examiner* — Ajay Bhatia
*Assistant Examiner* — Miranda Huang
(74) *Attorney, Agent, or Firm* — Lee Law, PLLC; Christopher B. Lee

(57) ABSTRACT

A memory allocation message for each primary memory allocation in a primary memory made by a primary processor is received at a hardware memory management module. A representation of each primary memory allocation is allocated within a second memory in response to each memory allocation message. A determination is made, based upon the allocated representations of each primary memory allocation within the second memory, to free a primary memory allocation in the primary memory. A memory free message is sent to the primary processor instructing the primary processor to free the primary memory allocation in the primary memory.

24 Claims, 9 Drawing Sheets

(56) References Cited

U.S. PATENT DOCUMENTS

| | | | |
|---|---|---|---|
| 2008/0195682 | A1 | 8/2008 | Holt |
| 2008/0263295 | A1 | 10/2008 | Printezis et al. |
| 2008/0320485 | A1* | 12/2008 | Joffe et al. .................. 718/104 |
| 2009/0006506 | A1 | 1/2009 | DiFlora |
| 2009/0055603 | A1 | 2/2009 | Holt |
| 2010/0082930 | A1* | 4/2010 | Jiva et al. .................. 711/166 |

OTHER PUBLICATIONS

Scott Nettles, James O'Toole, Real-Time Replication Garbage Collection, Article, Conference on Programming Language Design and Implementation, 1993, pp. 1-10, Association for Computing Machinery (ACM), New York, NY.

James O'Toole, Scott Nettles, Concurrent Replicating Garbage Collection, Article, Conference on LISP and Functional Programming, 1994, pp. 1-8, Association for Computing Machinery (ACM), New York, NY.

Jeffrey Richter, Garbage Collection: Automatic Memory Management in the Microsoft .NET Framework, Article, MSDN Magazine, Dec. 2000, pp. 1-18, Microsoft Corporation, Published on the World Wide Web.

Matthias Meyer, An On-Chip Garbage Collection Coprocessor for Embedded Real-Time Systems, Article, Proceedings of the 11th IEEE International Conference on Embedded and Real-Time Computing Systems and Applications, Aug. 2005, pp. 517-524, IEEE Computer Society, Hong Kong.

Kevin D. Nilsen, Cost-Effective Hardware-Assisted Real-Time Garbage Collection, Article, ACM SIGPLAN Conference on Programming Language Design and Implementation, 1994, pp. 1-10, Association for Computing Machinery (ACM), New York, NY.

Kevin Nilsen, A High-Performance Architecture for Real-Time Garbage Collection, Article, Submitted to OOPSLA Workshop on Garbage Collection in Object-Oriented Systems, 1991, pp. 1-5, Published on the World Wide Web.

United States Patent and Trademark Office, Office Action for U.S. Appl. No. 12/645,537, Apr. 4, 2012, pp. 1-16, Alexandria, VA, USA.

Tamar Domani, et al., Implementing an On-the-fly Garbage Collector for Java, Article, ACM SIGPLAN Notices, 2001, pp. 1-15, vol. 36, Issue 1, Association for Computing Machinery (ACM), New York, NY, USA.

Author Unknown, TADS 3 System Manual: Automatic Garbage Collection and Finalization, Webpage/site, Printed from Website on Dec. 9, 2009, pp. 1-4, Published on the World Wide Web at http://www.tads.org/t3doc/doc/sysman/gc.htm.

John N. Zigman, Stephen M. Blackburn, Java Finalize Method, Orthogonal Persistence and Transactions, Article, Proceedings of the 8th International Workshop on Persistent Object Systems (POS8), 1999, pp. 1-7, Morgan Kaufmann Publishers Inc., San Francisco, CA, USA.

United States Patent and Trademark Office, Notice of Allowance for U.S. Appl. No. 12/645,537, Nov. 16, 2012, pp. 1-9, Alexandria, VA, USA.

United States Patent and Trademark Office, Office Action for U.S. Appl. No. 12/645,537, Aug. 27, 2012, pp. 1-13, Alexandria, VA, USA.

\* cited by examiner

HARDWARE OFF-LOAD MEMORY GARBAGE COLLECTION ACCELERATION

RELATED APPLICATIONS

This application is related to concurrently filed U.S. utility patent application Ser. No. 12/645,537, titled "HARDWARE OFF-LOAD GARBAGE COLLECTION ACCELERATION FOR LANGUAGES WITH FINALIZERS," which is incorporated herein by reference in its entirety.

BACKGROUND

The present invention relates to memory garbage collection. More particularly, the present invention relates to hardware off-load memory garbage collection acceleration.

Conventional memory garbage collection is performed by a processor to determine memory allocations that are no longer needed by the processor. A processor executes an algorithm, known as a garbage collection algorithm, to identify the memory allocations that it no longer needs. Examples of garbage collection algorithms include a mark and sweep garbage collection algorithm and a reference counting garbage collection algorithm.

BRIEF SUMMARY

A method includes receiving, at a hardware memory management module, a memory allocation message for each primary memory allocation in a primary memory made by a primary processor; allocating, within a second memory in response to each memory allocation message, a representation of each primary memory allocation; determining, based upon the allocated representations of each primary memory allocation within the second memory, to free a primary memory allocation in the primary memory; and sending a memory free message to the primary processor instructing the primary processor to free the primary memory allocation in the primary memory.

A system includes a first processor operatively coupled to a first memory; a bi-directional message queue; and an off-load processor operatively coupled to a second memory, and programmed to: receive, via the bi-directional message queue, a memory allocation message for each primary memory allocation in the first memory made by the first processor; allocate, within the second memory in response to each memory allocation message, a representation of each primary memory allocation; determine, based upon the allocated representations of each primary memory allocation within the second memory, to free a primary memory allocation in the first memory; and send, via the bi-directional message queue, a memory free message to the first processor instructing the first processor to free the primary memory allocation in the first memory.

A computer program product includes a computer useable storage medium including computer readable program code, wherein the computer readable program code when executed on a computer causes the computer to: receive a memory allocation message for each primary memory allocation in a first memory made by a first processor; allocate, within a second memory in response to each memory allocation message, a representation of each primary memory allocation; determine, based upon the allocated representations of each primary memory allocation within the second memory, to free a primary memory allocation in the first memory; and send a memory free message to the first processor instructing the first processor to free the primary memory allocation in the first memory.

DETAILED DESCRIPTION

Figure 1:
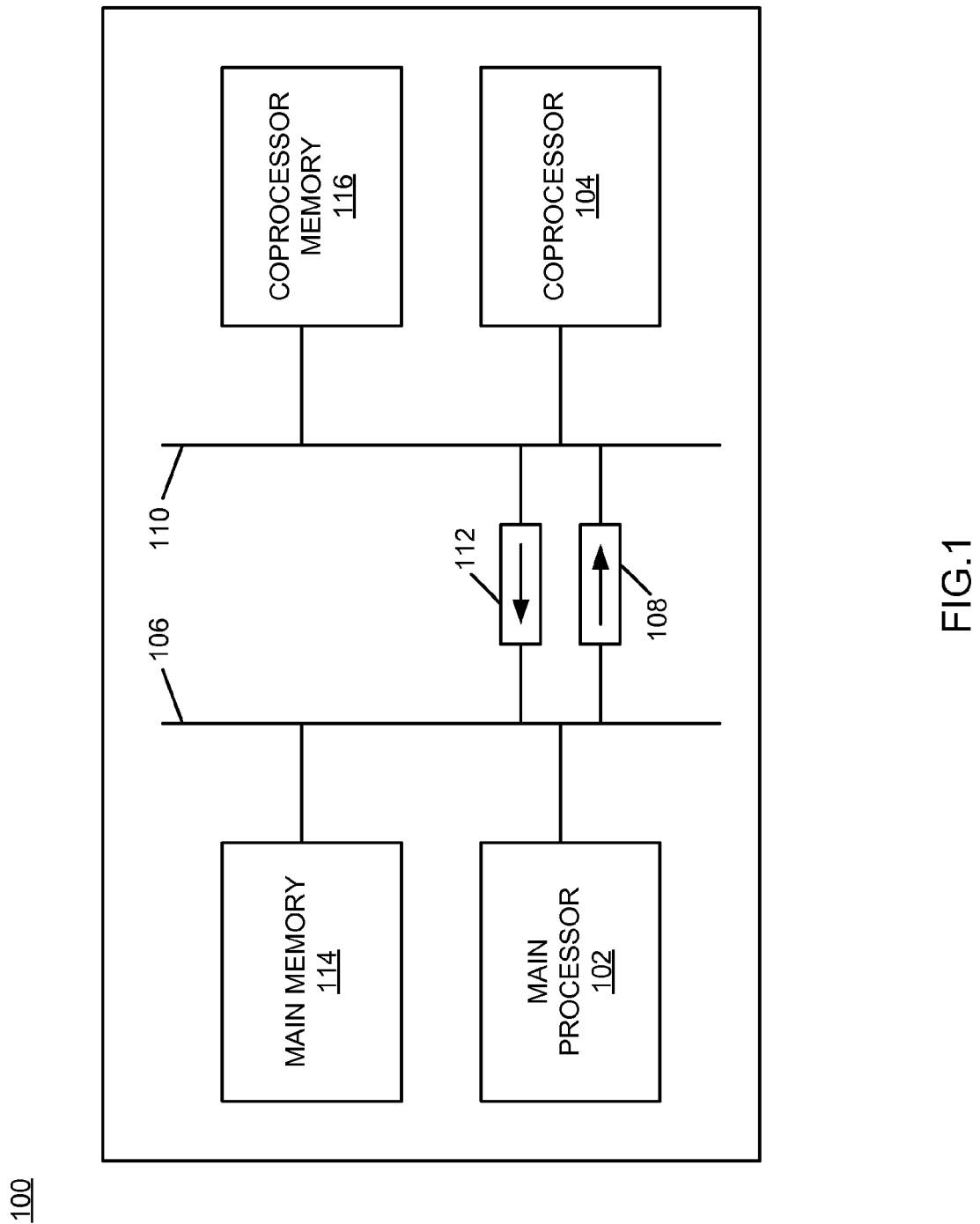
FIG. 1 is a block diagram of an example of an implementation of a system for automated hardware off-load memory garbage collection acceleration according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides hardware off-load memory garbage collection acceleration. A system for hardware off-load memory garbage collection acceleration includes a main (e.g., primary) processor and a coprocessor that operates as a hardware off-load module. Performance improvements for the main processor involve off-loading garbage collection activities to the coprocessor.

Rather than performing its own memory management for garbage collection, the main processor communicates with the coprocessor to inform the coprocessor of memory allocation and memory update activities. The coprocessor independently and autonomously executes garbage collection activities and identifies memory allocations that are no longer used by the main processor. The coprocessor communicates with the main processor to instruct the main processor to free the identified memory allocations that are no longer in use. As such, the time consuming task of memory garbage collection is partitioned from the main processor and performance for the main processor may be improved. It should be noted that in a different embodiment, the main processor and co-processor may be separate threads and the separate threads may be running on separate processors of a multi-processor system.

The main processor is coupled to a main (e.g., primary) memory and the coprocessor is coupled to a second memory. The main processor executes one or more applications and allocates memory for the various applications within the main memory. Rather than performing its own memory management for garbage collection, the main processor additionally sends a memory allocation message for each primary memory allocation in the main memory to the coprocessor. The coprocessor receives the memory allocation message and allocates a representation of each primary memory allocation within the second memory in response to each received memory allocation message. The coprocessor executes a garbage collection algorithm concurrently with the main processor actively processing application actions. The coprocessor identifies memory allocations within the second memory that are no longer in use by the main processor and sends a memory free message to the primary processor instructing the primary processor to free the main memory allocation in the main memory.

The main processor and the coprocessor are separated and communicate via a bi-directional message queue. The bi-directional message queue may be implemented using two uni-directional message buffers/queues. Each processor has write access to one of the two uni-directional message queues and read access to the other message queue. The respective uni-directional message queues may be memory mapped, register mapped, or otherwise accessible for write and read operations, respectively, by the respective processors. When either processor wishes to communicate with the other, it writes a message to its respective mapped write message queue. On the opposite receive side for each message queue, the respective other processor reads messages written to its respective mapped read message queue. The uni-directional message queues may be organized as a first in first out (FIFO) queue structure. As such, the first message written to one of the message queue by one of the processors will be the first message read by the other processor. It should be noted that in a different embodiment, the bi-directional message queues may be implemented in shared memory and software or may use some other dedicated message passing hardware which may be available in a multi-processor system.

In one example implementation, the main memory and the second memory may be implemented with memory devices that are the same size. This form of implementation shall be referred to herein as "direct mapping" between the main memory and the second memory. In this example, the coprocessor may allocate a memory object identical to the memory object allocated by the main processor. Memory allocations within the coprocessor may include metadata (e.g., memory management bits, flags, or other metadata) to allow the coprocessor to identify the unused memory allocations in the main memory. The metadata may include identifiers to represent items as root set memory objects (e.g., static or global variables or pointers, stack variables or pointers, or other root set memory objects). Memory allocations within the main memory may include reserved storage for the metadata used by the coprocessor to provide the storage location(s) for the metadata created and used by the coprocessor.

In an alternative example implementation, the coprocessor may implement a set of data structures for managing memory allocations in the main memory instead of allocating memory objects that are identical to those allocated by the main processor. In such an implementation, a second memory smaller than the main memory may be used. The set of data structures may include a memory allocation header element and a memory pointer element. This form of implementation shall be referred to herein as "reduced mapping" within the second memory relative to the main memory.

The memory allocation header element may be allocated within the second memory in response to a memory allocation message (e.g., a create object message) received from the main processor. The memory allocation message may include a base address and a size of the memory allocation within the main memory, along with an indication of whether the object is a root set memory object. The memory allocation header element may be created to include the base address and the size of the main memory allocation within the main memory, along with the indication of whether the object is a root set memory object. Additional storage for garbage collection (e.g., a mark bit for use during garbage collection) may be added to the created memory allocation header element for each memory allocation within the main memory.

When the main processor initializes a memory allocation as a pointer, it may send a pointer initialization message (e.g., a pointer update message) to the coprocessor. The pointer initialization message may include an address within the main memory (e.g., the pointer "value") to which the pointer has been initialized. The coprocessor may create a memory pointer element within the second memory to represent the initialized pointer in the main memory. The coprocessor may create one or more (e.g., multiple) memory pointer elements for a given memory allocation header element in response to multiple pointer update messages received from the main processor. The coprocessor may further update previously created memory pointer elements in response to pointer update messages that reference storage addresses of previously created pointers in the main memory. As such, memory pointer elements may be both created and updated with a new value using pointer update messages sent to the coprocessor from the main processor.

To manage the relationships between the created memory allocation header elements and the one or more created memory pointer elements in the second memory, the coprocessor may create and utilize information (e.g., metadata) that relates the various created memory elements within the second memory. This metadata may relate the memory allocation header element previously created for the memory allocation and the created or updated one or more memory pointer elements associated with each memory allocation header element.

It should be noted that a one-to-many relationship may exist between header elements and memory pointer elements. This relationship may occur, for example, when a main processor creates a complex data structure that includes multiple pointers. Conversely, a memory pointer element maps to only one header element. As such, for example, the coprocessor may create a tree structure, such as a trie structure or some other kind of associative container or array (each alternative generally referred to herein as an "associative mapping structure" for ease of description), to identify created memory pointer elements based upon use of the base address and memory allocation size represented within a memory allocation header element. Conversely, the coprocessor may create either a hash table or a tree structure, such as a trie structure or some other kind of associative mapping structure, to identify a memory allocation header element based upon the address represented within memory pointer elements. As such, with a reference to either a memory allocation header element or a memory pointer element, the associated memory pointer element(s) or memory allocation header element, respectively, may be identified within the second memory.

Garbage collection algorithms, such as the various mark and sweep or counting garbage collection algorithms, may be executed by the coprocessor against the memory allocations within the second memory. These various garbage collection algorithms will not be described herein for brevity. However, it is understood that a person of skill in the art will be able to implement such a garbage collection algorithm in association with the present subject matter based upon the description herein.

The hardware off-load memory garbage collection acceleration described herein may be performed in real time to allow prompt memory garbage collection with reduced primary processor overhead. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated hardware off-load memory garbage collection acceleration. A main processor 102 and a coprocessor 104 communicate, as described above and in more detail below, to carry out the automated hardware off-load memory garbage collection acceleration described herein.

The main processor 102 is operatively coupled via an interconnection 106 to a uni-directional message queue 108 (hereinafter "message queue 108") to send messages to the coprocessor 104. Similarly, the coprocessor 104 is operatively coupled via an interconnection 110 to a uni-directional message queue 112 (hereinafter "message queue 112") to send messages to the main processor 102. The main processor 102 may be implemented to have only write access to the message queue 108 and only read access to the message queue 112. Similarly, the coprocessor 104 may be implemented to have only write access to the message queue 112 and only read access to the message queue 108. The respective message queues may be memory mapped, register mapped, or otherwise accessible for write and read operations, respectively, by the respective processors. Details of implementation for mapping write operations and read operations to the respective message queues are omitted for brevity. However, it is understood that a person of skill in the art would be able to implement such a mapping for the respective processors based upon the description herein, such as by use of read and write signals associated with the respective processors.

The main processor 102 is also operatively coupled via the interconnection 106 with a main memory 114 to create and access memory allocations for use by applications executed by the main processor 102. The coprocessor 104 is similarly operatively coupled via the interconnection 110 with a coprocessor memory 116 to create and access memory allocations for performing garbage collection activities for the main processor 102.

It is understood that the main memory 114 and the coprocessor memory 116 may include any combination of volatile and non-volatile memory suitable for the intended purpose, distributed or localized as appropriate, and may include other memory segments not illustrated within the present example for ease of illustration purposes. For example, the main memory 114 and the coprocessor memory 116 may include a code storage area, a code execution area, and a data area without departure from the scope of the present subject matter. As such, code space for run-time memory allocations by the main processor 102 and coprocessor 104 will be described in detail herein and references herein to direct mapping and reduced mapping refer to run-time memory allocation areas, such as data areas, associated with the respective processors.

The interconnection 106 and the interconnection 110 may include a system bus, a network, or any other interconnection capable of providing the respective components with suitable interconnection for the respective purpose.

It should further be noted that the message queue 108 may be sized sufficiently to allow the coprocessor 104 to perform garbage collection without the message queue 108 filling to capacity. This size may be small or zero, if the garbage collection algorithm is one of the concurrent algorithms, such as reference counting. The size may be large if the garbage collection algorithm is not one of the concurrent algorithms, such as mark and sweep. Additionally, for an implementation of either of the interconnection 106 or the interconnection 110 that includes a network or other protocol-based interconnection with associated protocol overhead, the message queue 108 may be sized sufficiently to accommodate interconnection delays for message propagation. Similarly, the message queue 112 may be sized sufficiently to allow the coprocessor 104 to communicate with the main processor 102 and for the main processor 102 to retrieve all messages without the message queue 112 filling to capacity. It should be further noted that software and hardware may maintain its own non-shared queues in addition to these shared queues. If a shared queue is full, the non-shared queues may be used for additional buffering.

As will be described in more detail below in association with FIG. 2 through FIG. 9, the coprocessor 104 provides automated hardware off-load memory garbage collection acceleration. The automated hardware off-load memory garbage collection acceleration is based upon messaging received from the main processor 102 that identifies memory allocations, pointer initialization, and update activities carried out by the main processor 102. The coprocessor 104 performs garbage collection activities, in association with the memory allocations in the coprocessor memory 116, to identify memory allocations in the main memory 114 that are no longer in use and that may be freed by the main processor 102. The coprocessor 104 sends messages to the main processor 102 instructing to the main processor 102 to free the unused memory allocations. Performance for the main processor 102 may be improved by use of automated hardware off-load memory garbage collection acceleration.

Figure 2:
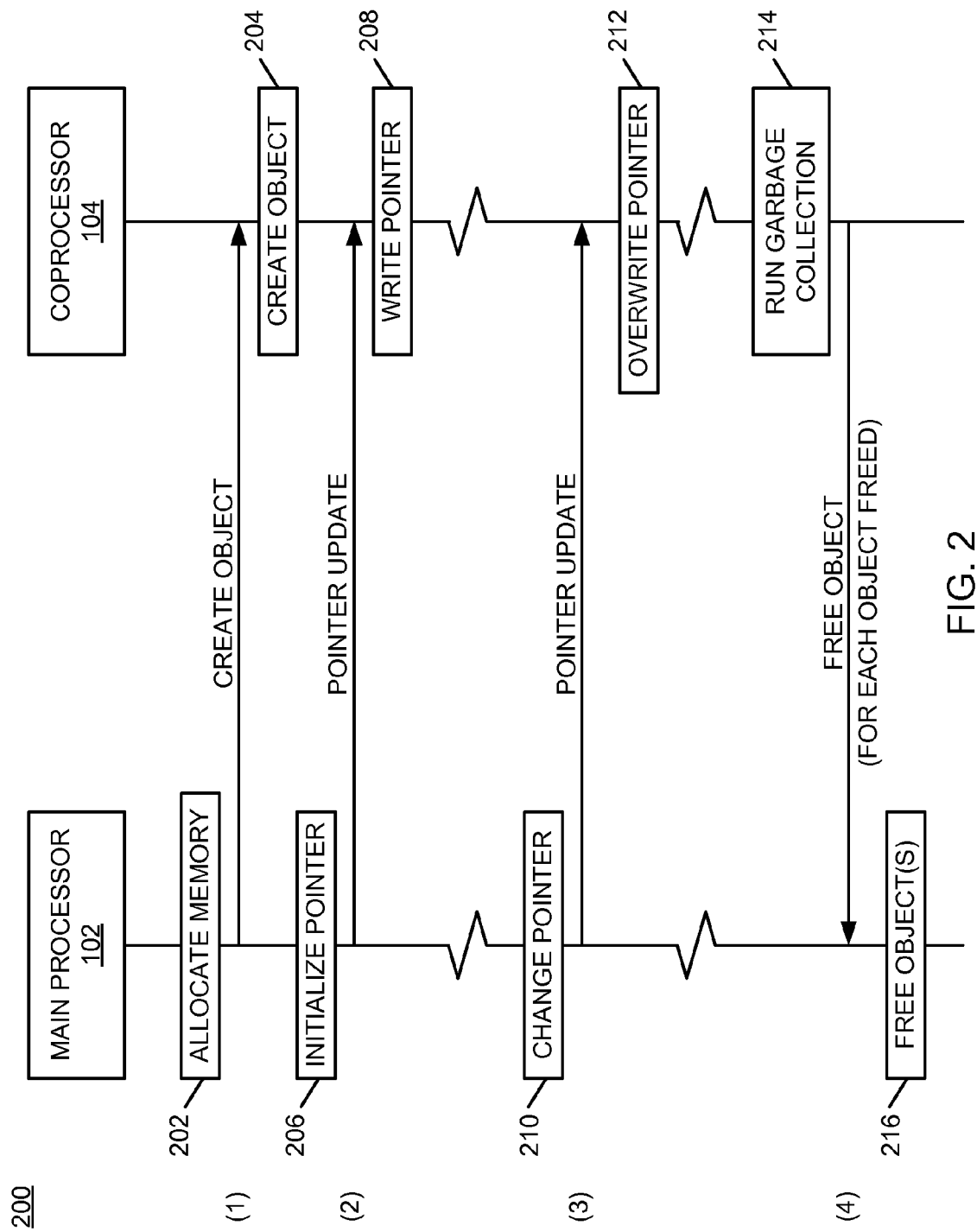
FIG. 2 is a message flow diagram of an example of an implementation of a messaging interaction between a main processor and a coprocessor for automated hardware off-load memory garbage collection acceleration according to an embodiment of the present subject matter.
Figure 3:
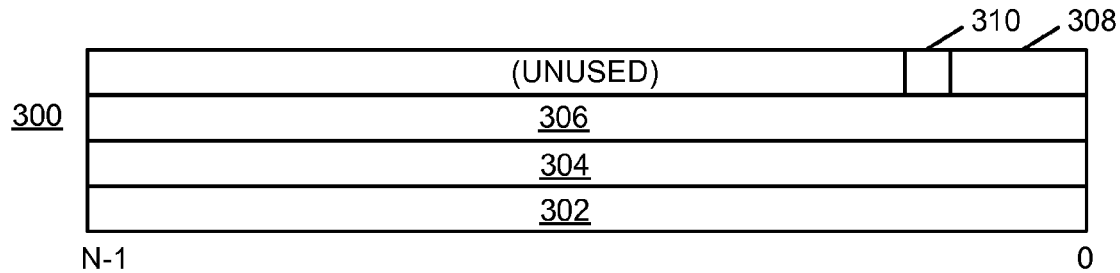
FIG. 3 is an illustration of example implementations of message formats that may be used for messages described in association with FIG. 2 according to an embodiment of the present subject matter.
Figure 3:
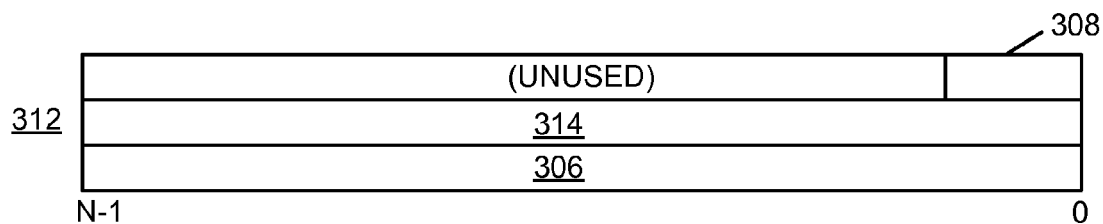
Figure 3:
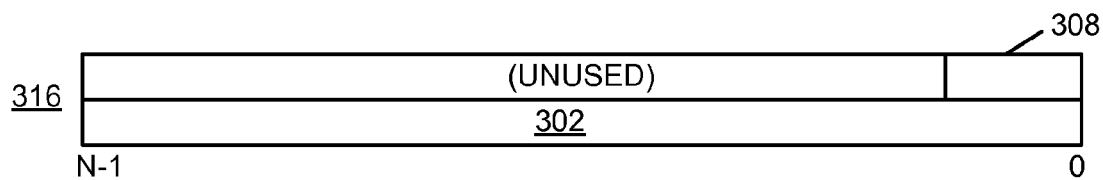
Figure 4:
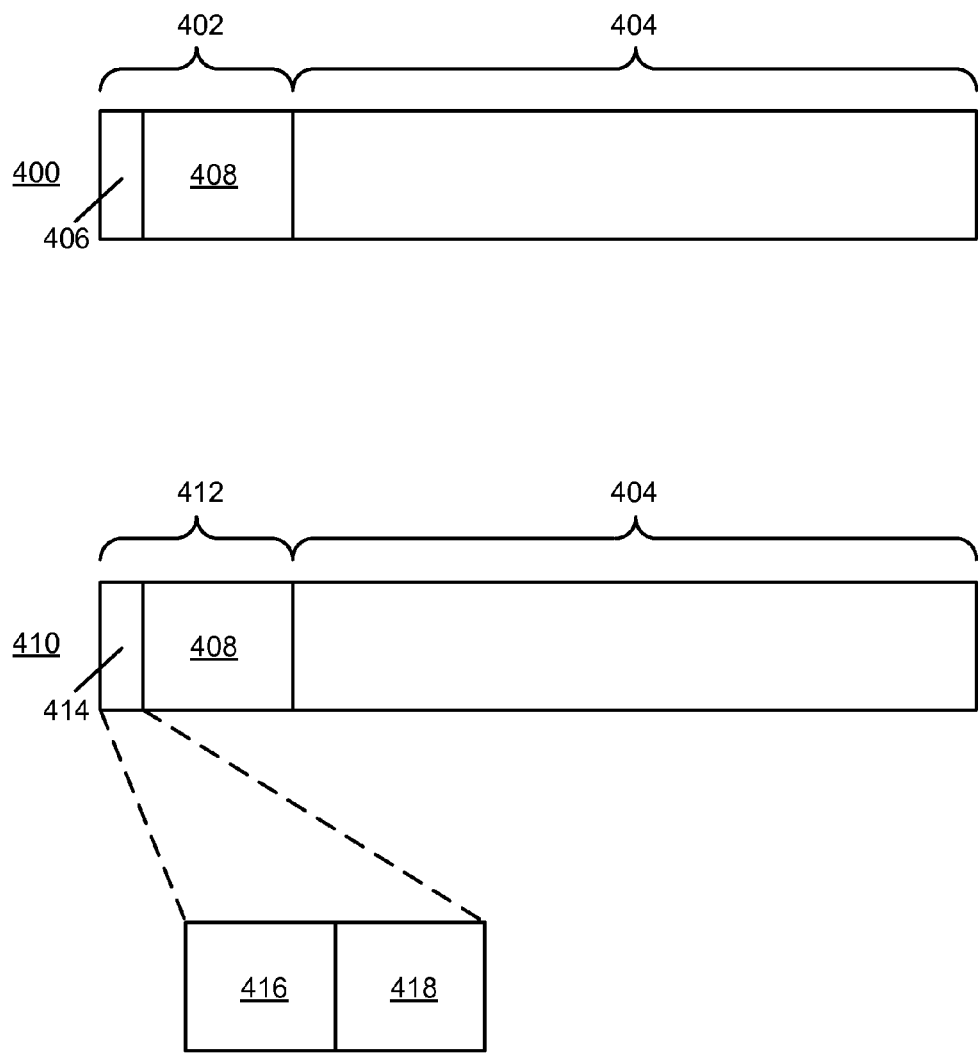
FIG. 4 is a block diagram of an example of an implementation of memory allocations for direct mapping between a main memory and a coprocessor memory according to an embodiment of the present subject matter.
Figure 5:
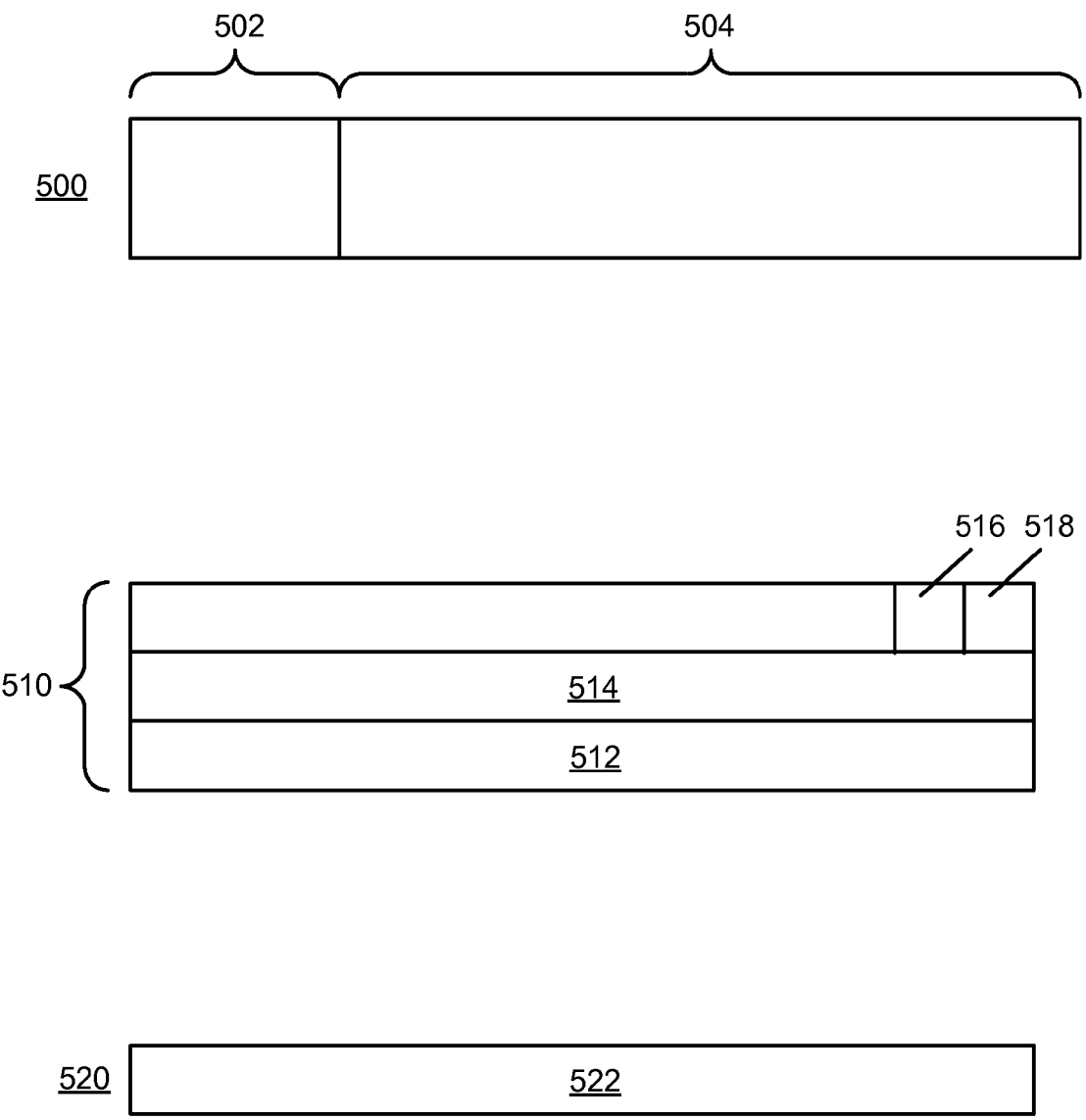
FIG. 5 is a block diagram of an example of an implementation of memory allocations for reduced mapping within the coprocessor memory relative to memory allocations within the main memory according to an embodiment of the present subject matter.
Figure 6:
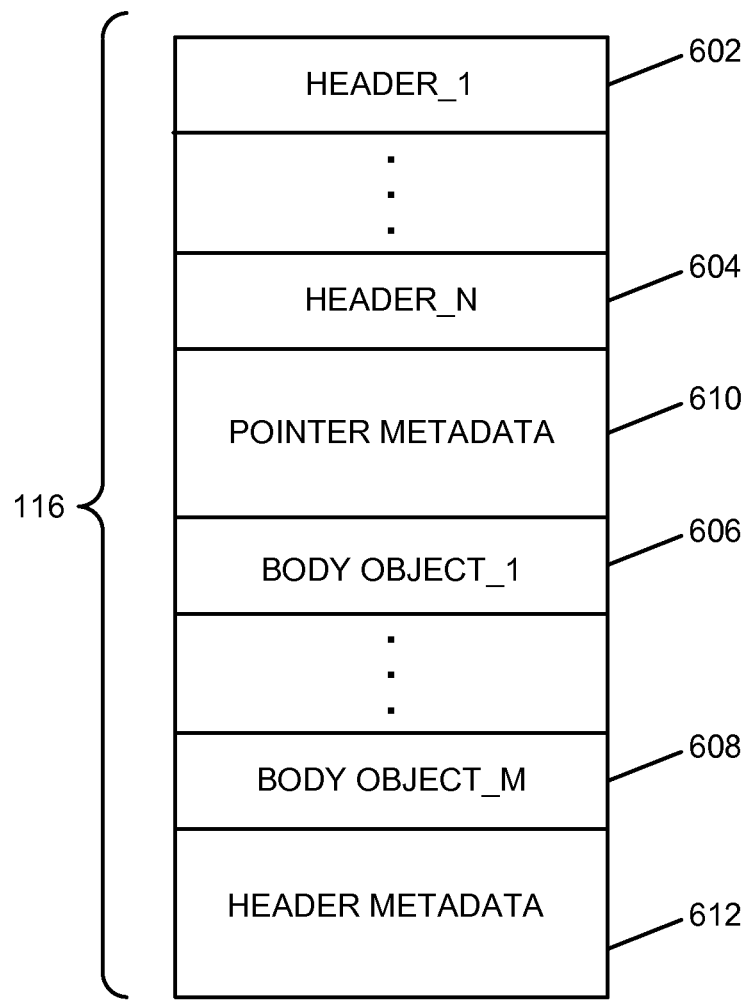
FIG. 6 is a block diagram of an example of an implementation of memory allocations and associated metadata for reduced mapping within the coprocessor memory according to an embodiment of the present subject matter.
Figure 7:
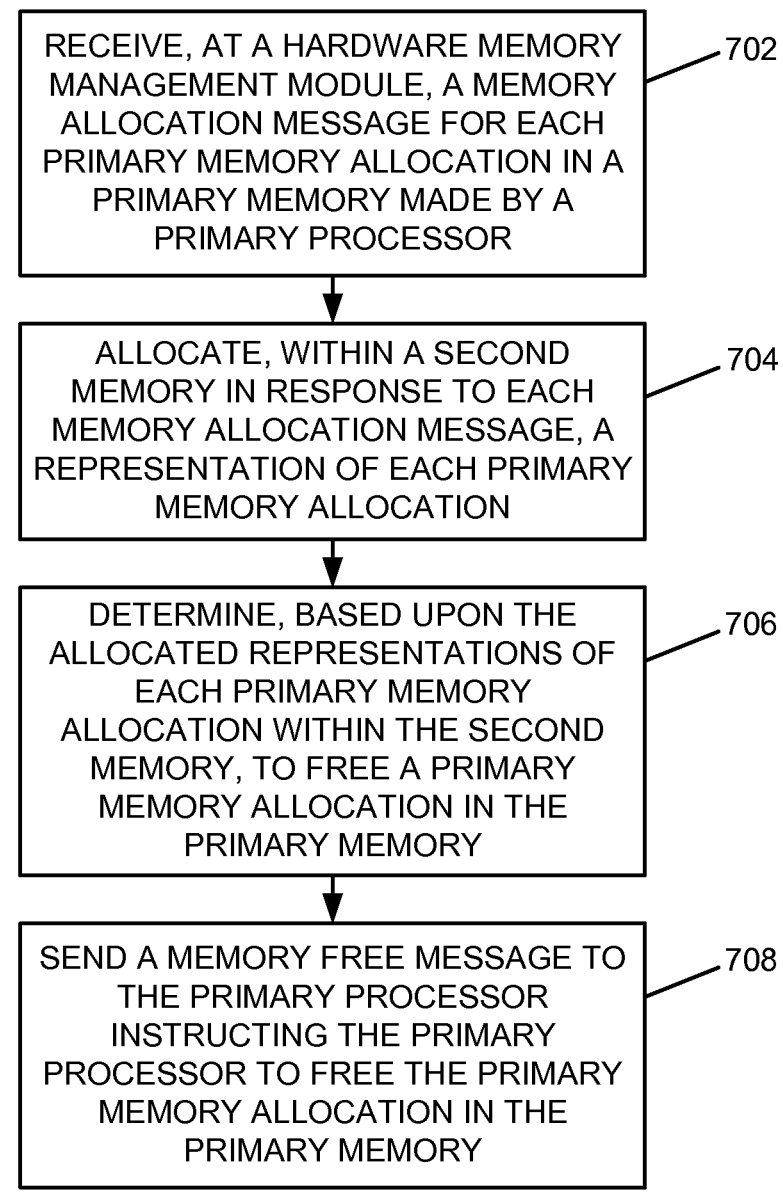
FIG. 7 is a flow chart of an example of an implementation of a process for automated hardware off-load memory garbage collection acceleration according to an embodiment of the present subject matter.
Figure 8:
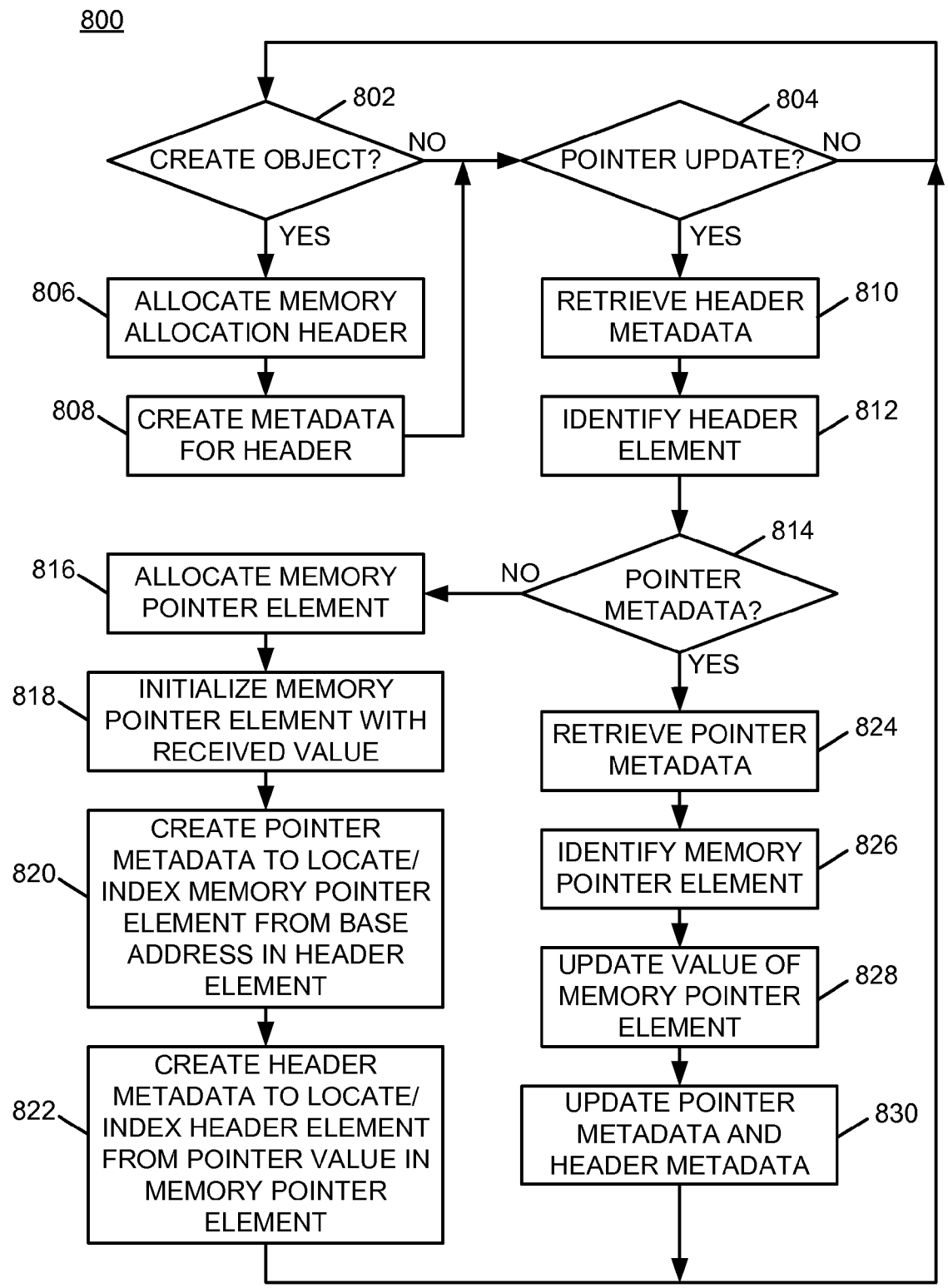
FIG. 8 is a flow chart of an example of an implementation of a process for automated hardware off-load memory garbage collection acceleration to receive and process messages for memory element creation and pointer updating according to an embodiment of the present subject matter.
Figure 9:
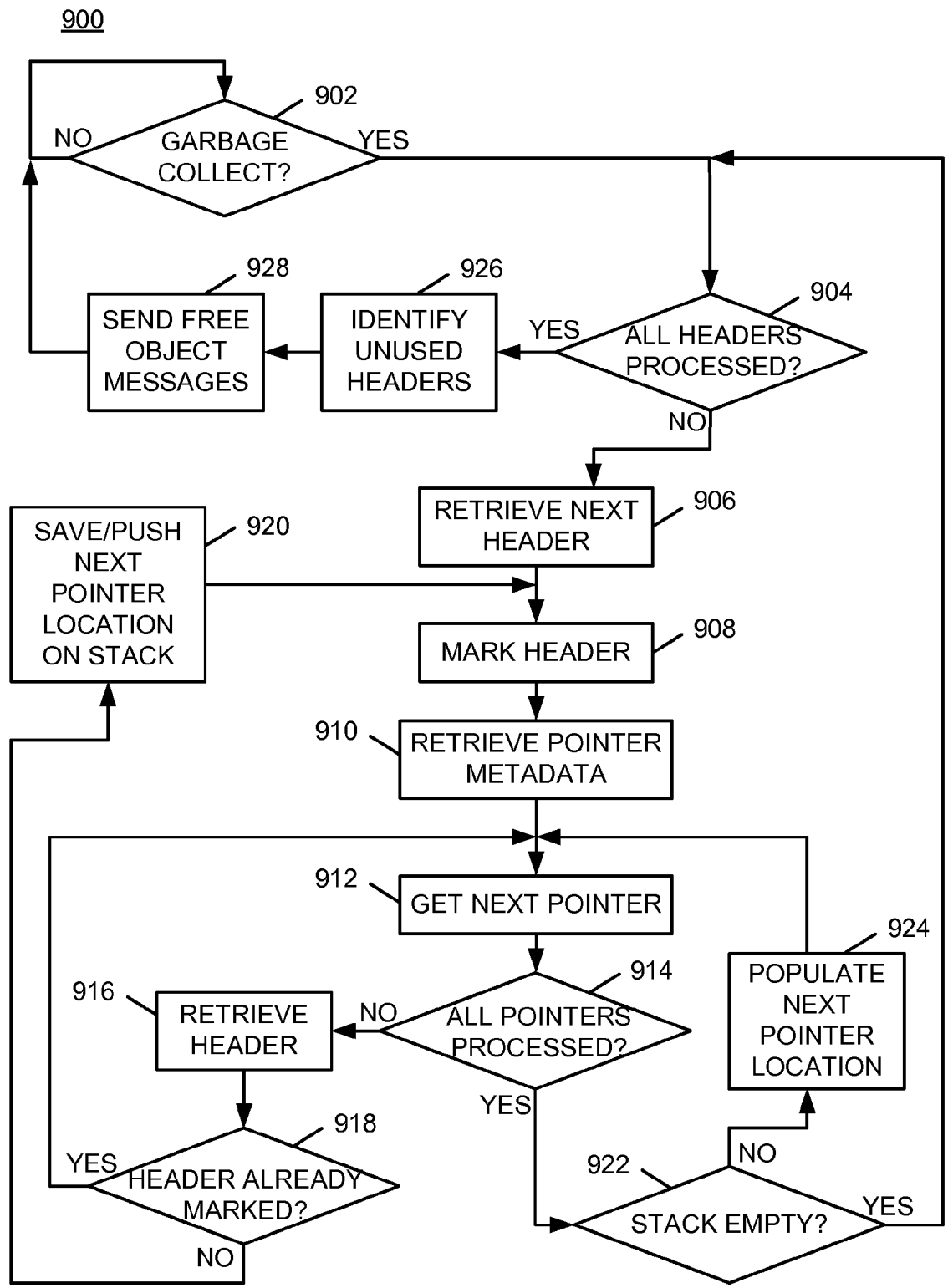
FIG. 9 is a flow chart of an example of an implementation of a process for automated hardware off-load memory garbage collection acceleration using a processor memory stack to instruct a main processor to free memory allocations according to an embodiment of the present subject matter.

FIG. 2 described below shows an example message flow for messaging between the main processor 102 and the coprocessor 104. FIG. 3 described below shows example message formats that may be used for communication between the main processor 102 and the coprocessor 104. FIG. 4 and FIG. 5 show examples of memory allocation elements used by the direct mapping and reduced mapping implementations, respectively. FIG. 6 shows an example memory organization for the reduced mapping implementation. FIG. 7 through FIG. 9 show example flow charts that may be used to implement the present subject matter. Reference may be made between the respective figures throughout the description below to facilitate further understanding of the present subject matter.

FIG. 2 is a message flow diagram of an example of an implementation of a messaging interaction 200 between the main processor 102 and the coprocessor 104 for automated hardware off-load memory garbage collection acceleration. For ease of illustration, the message queue 108 and the message queue 112 are omitted from FIG. 2. However, it is understood that the message queue 108 and the message queue 112, or a similar messaging system, convey the respective messages to the respective processors, as described in more detail below.

At block 202, the main processor 102 allocates a memory element within the main memory 114. The memory allocation performed at block 202 may include allocation of a single byte, an integer, a word, or another storage allocation. The allocation performed at block 202 may further include allocation of a complex data structure, such as an array, an array of pointers, or other complex data structure.

In response to the memory allocation at block 202, the main processor 102 sends a create object message to the coprocessor 104 (line 1). In response to receipt of the create object message, the coprocessor 104 creates an object representative of the allocated memory element referenced within the create object message at block 204.

For purposes of illustration, the present example assumes that the allocated memory at block 202 includes at least one pointer. However, it is understood that the present subject matter may be utilized with non-pointer allocations.

At block 206, the main processor 102 initializes a pointer within the previously-allocated memory area. In response to initialization of the pointer, the main processor 102 sends a pointer update message to the coprocessor 104 (line 2). The pointer update message includes the address of the previously-allocated memory area where the pointer is initialized and the initialized pointer value (e.g., the address pointed to by the pointer). For a complex data structure within which the pointer is initialized, the address of the pointer that is initialized may be different from a base address of the memory allocation for the complex data structure, as described in more detail below. At block 208, in response to receipt of the pointer update message, the coprocessor 104 writes the address representative of the pointer value to the object created in block 204.

At some time later, as represented by the first pair of jagged markings in FIG. 2, the present example assumes that the main processor 102 changes the pointer value at block 210. In response to changing the pointer value, the main processor 102 sends another pointer update message to the coprocessor 104 (line 3). As such, and as can be seen from the present example, the main processor 102 sends a pointer update message in response to both initialization of a pointer value and for changes to pointer values. In response to receipt of the second pointer update message, the coprocessor 104 determines whether an address associated the pointer update message references the object that was previously created (e.g., at block 204) and initialized (e.g., written at block 208). In response to determining that the second pointer update message references the object that was previously created and initialized, the coprocessor 104 overwrites the pointer value at block 212.

Immediately, or at some later time, as represented by the second pair of jagged markings in FIG. 2, the coprocessor 104 runs a garbage collection algorithm at block 214. As described above and in more detail below, the garbage collection algorithm may include any garbage collection algorithm appropriate for a given implementation. During the garbage collection activities associated with block 214, the coprocessor 104 identifies memory objects within the coprocessor memory 116 that represent objects within the main memory 114 that are no longer in use by the main processor 102.

In response to completion of the garbage collection activities at block 214, the coprocessor 104 sends a free object message to the main processor 102 for each object that is no longer in use by the main processor 102 (line 4). In response to receipt of each free object message, at block 216, the main processor 102 frees the memory object referenced by each respective free object message within the main memory 114.

As such, the example messaging interaction 200 between the main processor 102 and the coprocessor 104 allows the main processor 102 to allocate memory without having to run garbage collection to identify memory elements that are no longer used by the main processor 102. The coprocessor 104 operates as a hardware off-load memory garbage collection acceleration module and performs garbage collection on behalf of the main processor 102. The main processor 102 receives free object messages from the coprocessor 104 and frees objects that have been identified as no longer in use.

Accordingly, the main processor 102 may operate more efficiently and may continue other processing activities while the coprocessor 104 performs garbage collection for the main processor 102. As discussed above, the message queue 108 and the message queue 112 may be sized as appropriate for a given implementation to accommodate messages that accumulate during garbage collection activities. Further, idle cycles for the main processor 102 may be used to retrieve free object messages and to free the actual memory allocations within the main memory 114.

FIG. 3 is an illustration of example implementations of message formats that may be used for the messages described in association with FIG. 2 above. A create object message format 300 includes an address of object field 302, a size of object field 304, and an address of pointer field 306. The address of object field 302, the size of object field 304, and the address of pointer field 306 include N bits (e.g., labeled zero to N−1). The N bits represent the addressing used on the interconnection 106 by the main processor 102 to access the respective memory object. As such, the number of bits (e.g., N) may be selected based upon the addressing capabilities of a processor for a given implementation.

It should be noted that the address of pointer field 306 represents an address of a pointer that will receive the address of the allocated memory object as a pointer value. The address of pointer may be used to create a reference to the memory object created within the coprocessor memory 116 to mitigate a race condition between the received create object message and garbage collection processing. Processing to create initial references to memory objects is described in more detail below. For purposes of the present portion of this description, initial references to newly created memory objects may be initialized in association with create object messages to ensure that newly-created memory objects are not freed during garbage collection processing before they are otherwise referenced within the main memory 114 by the main processor 102.

It should further be noted that alternative processing may be performed by the coprocessor 104 to avoid the messaging overhead associated with adding the address of pointer field 306 to create object messages. The coprocessor 104 may alternatively assign a pointer address value to created memory objects to prevent freeing newly-created memory objects in association with the race condition described above. As another alternative, a requirement may be implemented for the main processor 102 to send a pointer update message immediately after a sending create object message to alleviate the race condition issue while preserving a smaller message format size. Many other alternatives are possible for managing race conditions between the object initialization processing and the garbage collection processing and all are considered within the scope of the present subject matter.

The create object message format 300 further includes a message type field 308 and a root set indicator field 310. The message type field 308 may include, for example, a two-bit message type field. Within the present example, a message type code of "00" binary may be used to indicate that the message was formed using the create object message format 300. The root set indicator field 310 may include a single bit field and may be used to indicate whether the memory object associated with the create object message format 300 is a root set object, as otherwise described herein.

A pointer update message format 312 includes an address of pointer field 306 identical to that described above. The pointer update message format 312 further includes a pointer value field 314. As such, the pointer update message format 312 may be used to indicate, as described above, an address of a pointer and a value to be associated with that pointer for both newly-created pointers and for updated pointers. The pointer update message format 312 also includes the message type field 308 described above. The message type field 308 may include, for purposes of the present example, a value of "01" binary to represent that the message was formed using the pointer update message format 312.

A free object message format 316 also includes the address of object field 302 identical to that described above. However, it is noted that the free object message is sent from the coprocessor 104 to the main processor 102. As such, a free object message formed using the free object message format 316 represents an instruction to the main processor 102 to free a memory object located at the address associated with the free object message. The free object message format 316 also includes the message type field 308 as described above. The message type field 308 may include, for purposes of the present example, a value of "10" binary to represent that the associated message was formed using the free object message format 316.

It should additionally be noted that the respective message formats described above may be considered data structures that may be used to create the associated messages described above. As such, the respective message formats are stored to memory, such as memory associated with the message queue 108 and the message queue 112, when they are transmitted between the respective processing devices.

FIG. 4 is a block diagram of an example of an implementation of memory allocations for direct mapping between the main memory 114 and the coprocessor memory 116. A main memory object 400 represents a memory object that is allocated by the main processor 102 within the main memory 114. As can be seen from FIG. 4, the main memory object 400 includes a header segment 402 and a body segment 404. The body segment 404 includes storage for allocated memory associated with the main memory object 400. The header segment 402 further includes a reserved segment 406 and a header segment 408. The reserved segment 406 represents an area set aside for use by the coprocessor 104 that is not used by the main processor 102. The header segment 408 represents a header for use by the main processor 102 for creating and managing the main memory object 400.

For purposes of the present description, it is assumed that a header object, such as the header segment 402, will be associated with each memory object allocated by a processor, such as the main processor 102, and that additional space will be available for the reserved segment 406. However, for an implementation that does not allocate a header object, the reserved segment 406 may be established as appropriate for a given implementation.

A coprocessor memory object 410 represents a memory object that is allocated by the coprocessor 104 within the coprocessor memory 116 in response to receipt of a memory allocation message from the main processor 102. The coprocessor memory object 410 includes a header segment 412 and a body segment 404. The body segment 404 is identical to the body segment 404 within the main memory object 400. The header segment 412 further includes a coprocessor management data segment 414 and a header segment 408. The header segment 408 may be identical to the header segment 408 of the main memory object 400. The coprocessor management data segment 414 is used by the coprocessor 104 to manage memory allocations for garbage collection, as described above and in more detail below.

The coprocessor management data segment 414 may include, for example, storage space for two bits or flags that may be used for main processor 102 memory allocation tracking and for garbage collection purposes. A root set bit 416 may be used to indicate whether the body segment 404 represents a root set memory object (e.g., static or global variables or pointers, stack variables or pointers, or other root set memory objects). A mark bit 418 may be used to indicate whether the object has been marked by the garbage collection algorithm used in the particular implementation to indicate that the object is still in use.

It is noted that garbage collection algorithms often use a mark counter that inverts for each pass of the respective garbage collection algorithm. As such, the mark bit will be inverted during a mark phase of a mark and sweep garbage collection algorithm to indicate that the object is still in use and will not be inverted if the object is no longer used. Accordingly, the mark bit 418 may be used to mark the coprocessor memory object 410 (and thereby the associated main memory object 400) for freeing, as described above and in more detail below.

It is further understood that the present example represents one possible implementation of the present organization of the main memory object 400 and the coprocessor memory object 410. Many other possibilities exist for coprocessor management data, reserved storage relative to the main processor 102, and other control information. Accordingly, all such possibilities are considered within the scope of the present subject matter. It is also noted that complex data structures may be managed by the coprocessor 104 without additional overhead processing because each memory allocation made by the main processor 102 within the main memory 114 has a matching memory allocation within the coprocessor memory 116 that is made and managed by the coprocessor 104.

FIG. 5 is a block diagram of an example of an implementation of memory allocations for reduced mapping within the coprocessor memory 116 relative to memory allocations within the main memory 114. As described above, a reduced mapping implementation may allow for a smaller memory device to be used by the coprocessor 104 relative to a size of the memory device used by the main processor 102.

A main memory object 500 represents a memory object that is allocated by the main processor 102 within the main memory 114. As can be seen from FIG. 5, the main memory object 500 is similar to the main memory object 400 of FIG. 4. However, the main memory object 500 does not include a reserved area, such as the reserved segment 406 as described above in association with FIG. 4.

The main memory object 500 includes a header 502 and a body segment 504. The body segment 504 includes storage for allocated memory associated with the main memory object 500. The header segment 502 further represents a header for use by the main processor 102 for creating and accessing the main memory object 500, though it is understood that the header segment 502 may not be necessary for a given implementation of the present subject matter.

A coprocessor memory allocation header element 510 represents a first portion of a memory object that is allocated by the coprocessor 104 within the coprocessor memory 116 in response to receipt of a memory allocation message from the main processor 102. The memory allocation header element 510 includes an address segment 512 and a size segment 514. The address segment 512 includes the address of the main memory object referenced by the body segment 504 within the main memory object 500. The size segment 514 includes a size of the main memory object 500. As such, complex data structures may be initially represented by the address represented within the address segment 512 in conjunction with the size represented within the size segment 514. As will be described in more detail below, data structures that do not include pointers may be referenced by a header, such as the coprocessor memory allocation header element 510, while pointer allocations and updates are managed by use of a separate memory allocation by the coprocessor 104.

Coprocessor management data within the coprocessor memory allocation header element 510 includes storage space for two bits or flags that may be used for for garbage collection purposes. A root set bit 516 may be used to indicate whether a memory allocation represented within the address segment 512 and the size segment 514 represents a root set memory object (e.g., static or global variables or pointers, stack variables or pointers, or other root set memory objects). A mark bit 518 may be used to indicate whether the object has been marked by the garbage collection algorithm used in the particular implementation to indicate that the object is still in use.

Regarding pointer creation, as described above and in more detail below, when the main processor 102 creates a pointer within an allocated memory element, the main processor 102 sends a pointer update message. Upon receipt of a pointer update message, the coprocessor 104 determines whether a memory pointer element has already been created for the pointer referenced by the pointer update message. When a pointer memory element has not been created, the coprocessor 104 creates a memory pointer element. When a pointer memory element has already been created, the coprocessor 104 updates the memory pointer element. In either situation, the value of the pointer (e.g., the pointer's referenced address) is stored within the memory pointer element.

A memory pointer element 520 represents an example memory pointer element that may be created or updated in response to such a pointer update message. The memory pointer element 520 includes an address value segment 522 that stores an address value received from the main processor 102 in association with a pointer update message. As such, the memory pointer element 520 represents an actual pointer value.

Accordingly, the memory pointer element 520 may be considered a value element that may be used in association with a key element, such as used with a key-value pairing in database processing. As such, a key derived from an associated coprocessor memory allocation header element, such as the coprocessor memory allocation header element 510, may be used to determine the storage location of the memory pointer element 520. Similarly, a key derived from a memory pointer element may be used to access an associated coprocessor memory allocation header element. As described in more detail below, the respective key derivation may be performed using metadata associated with the respective memory elements.

FIG. 6 is a block diagram of an example of an implementation of memory allocations and associated metadata for reduced mapping within the coprocessor memory 116. A first coprocessor memory allocation header element 602 (Header_1) represents a first memory allocation received from the main processor 102. An "Nth" coprocessor memory allocation header element 604 (Header_N) represents a last memory allocation received from the main processor 102.

A first memory pointer element 606 (Body Object_1) represents storage for a first pointer update message (e.g., a pointer initialization) received from the main processor 102. An "Mth" memory pointer element 608 (Body Object_M) represents storage for a last pointer update message (also a pointer initialization) received from the main processor 102. It should be noted that the quantity "M" of memory pointer elements may be a different number than the quantity "N" of header elements.

Pointer metadata storage area 610 represents storage for information used for accessing body objects using information stored within a given header element. Similarly, header metadata storage area 612 represents storage for information used for accessing header elements using information stored within a given body object.

It should be noted that a one-to-many relationship may exist between header elements, such as the coprocessor memory allocation header element 602, and memory pointer elements. This relationship may occur, for example, when the main processor 102 creates a complex data structure that includes multiple pointers. Conversely, a memory pointer element maps to only one header element.

As such, the information stored within the pointer metadata storage area 610 may include, for example, a tree structure, such as a trie structure or some other kind of associative mapping structure, for deriving a key with which to index the body object(s) associated with the respective header element. Conversely, the information stored within the header metadata storage area 612 may include, for example, a hash table or a tree structure, such as a trie structure or some other kind of associative mapping structure, for deriving a key with which to index the header element associated with each body object.

FIG. 7 through FIG. 9 below describe example processes that may be executed by devices, such as the coprocessor 104, to perform the automated hardware off-load memory garbage collection acceleration associated with the present subject matter. Many other variations on the example processes are possible and all are considered within the scope of the present subject matter. It should be noted that time out procedures and other error control procedures are not illustrated within the example processes described below for ease of illustration purposes. However, it is understood that all such procedures are considered to be within the scope of the present subject matter.

FIG. 7 is a flow chart of an example of an implementation of a process 700 for automated hardware off-load memory garbage collection acceleration. At block 702, the process 700 receives, at a hardware memory management module, a memory allocation message for each primary memory allocation in a primary memory made by a primary processor. At block 704, the process 700 allocates, within a second memory in response to each memory allocation message, a representation of each primary memory allocation. At block 706, the process 700 determines, based upon the allocated representations of each primary memory allocation within the second memory, to free a primary memory allocation in the primary memory. At block 708, the process 700 sends a memory free message to the primary processor instructing the primary processor to free the primary memory allocation in the primary memory.

FIG. 8 is a flow chart of an example of an implementation of a process 800 for automated hardware off-load memory garbage collection acceleration to receive and process messages for memory element creation and pointer updating. At decision point 802, the process 800 makes a determination as to whether a create object message has been received by the coprocessor 104 from the main processor 102. When a determination is made at decision point 802 that a create object message has not been received, the process 800 makes a determination at decision point 804 as to whether a pointer update message has been received. When a determination is made at decision point 804 that a pointer update message has not been received, the process 800 returns to decision point 802 and iterates as described above.

As also described above, a create object message and a pointer update message may be received at a hardware memory management module, such as the coprocessor 104, for each primary memory allocation or update in a primary memory made by a primary processor, respectively. Each message may be received from the primary processor via a uni-directional message queue, such as the message queue 108.

Returning to the description of decision point 802, when a determination is made that a create object message has been received, the process 800 allocates a memory allocation header at block 806. As described above, for a direct memory mapping configuration, the coprocessor 104 may allocate, for each primary memory allocation in the primary memory made by the primary processor, the memory element within the coprocessor memory 116 identical to each respective primary memory allocation in the primary memory made by the primary processor. Alternatively, for a reduced memory mapping configuration, the coprocessor 104 may allocate a memory allocation header element within the coprocessor memory 116 that includes a base address and a size of the primary memory allocation within the primary memory. Additionally, as described above, the memory allocation header element may further include an indication that the element represents a root set element and a garbage collection management indicator.

At block 808, the process 800 creates metadata for the header. This header metadata may be used to locate the header using the associated base address, as described above. The process 800 then proceeds to decision point 804.

Returning to the description of decision point 804, when the process 800 determines that a pointer update message has been received, the process 800 retrieves the header metadata associated with the pointer address received in the pointer update message at block 810. At block 812, the process 800 identifies the header element based upon the retrieved header metadata. At decision point 814, the process 800 makes a determination as to whether there is any existing pointer metadata associated with the identified header element. When a determination is made at decision point 814 that there is no pointer metadata associated with the identified header element, such as for a pointer initialization operation, the process 800 allocates a memory pointer element at block 816. As described above, the pointer update message may include a primary memory address associated with a primary memory allocation and a pointer value. As such, at block 818, the process 800 initializes the memory pointer element with the received pointer value. At block 820, the process 800 creates pointer metadata to locate/index the memory pointer element from the base address in the header element. As such, the process 800 indexes the memory pointer element relative to the memory allocation header element.

It is further understood, that for complex data structures that may include multiple pointers, multiple pointer elements may be associated with a single header element. The element size, as described above in association with the header format, may be used to determine whether multiple pointer elements may be associated with a given header element. It should further be noted that indexing the memory pointer element relative to the memory allocation header element may further include generating pointer metadata that associate the memory allocation header element with one or more memory pointer elements. In such an implementation, the pointer metadata may identify a storage location of the memory pointer element within the coprocessor memory 116 derived via a tree structure, such as a trie structure or some other kind of associative mapping structure, based upon information within the memory allocation header element.

At block 822, the process 800 creates header metadata to locate/index the header element from the pointer value and the memory pointer element. The process 800 may generate header metadata that associates the memory pointer element with the memory allocation header element. The header metadata may identify a storage location of the memory allocation header element within the coprocessor memory 116 derived via a hash table, or a tree structure, such as a trie structure or some other kind of associative mapping structure, based upon information within the memory pointer element. The process 800 then returns to decision point 802 and iterates as described above.

Returning to the description of decision point 814, when the process 800 determines that pointer metadata does already exist, the process 800 also determines that the pointer element, associated with the pointer update message, has already been created in the coprocessor memory 116. As such, at block 824, the process 800 retrieves the pointer metadata that was previously created and associated with the identified header element. At block 826, the process 800 identifies the memory pointer element. At block 828, the process 800 updates the value of the memory pointer element. At block 830, the process 800 updates the pointer metadata and header metadata based upon the new pointer value stored in the memory pointer element. The process 800 then returns to decision 802 and continues iterating as described above.

As such, the process 800 provides for creation of memory elements through allocation of memory header elements and header metadata. The process 800 also provides for creation, initialization, and updating of pointers by allocating pointer elements and creating pointer metadata to reference created pointer elements back to the respective header elements. In response to receipt of create object messages and pointer update messages, the process 800 creates, manages, and updates the header metadata and the pointer metadata associated with the respective memory elements.

FIG. 9 is a flow chart of an example of an implementation of a process 900 for automated hardware off-load memory garbage collection acceleration using a processor memory stack to instruct a main processor, such as the main processor 102, to free memory allocations. At decision point 902, the process 900 makes a determination as to whether to perform a garbage collection activity. When a determination is made not to perform a garbage collection activity, the process 900 waits for an indication to begin garbage collection. As described above, garbage collection may be scheduled periodically, non-periodically, or incrementally as appropriate for a given implementation. Further, it should be noted that the garbage collection processing described in association with the process 900 is used to determine, based upon allocated representations of primary memory allocations within the coprocessor memory 116, whether to free the respective primary memory allocations. It should further be noted that the process 900 may be executed concurrently with the main processor 102 continuing to create memory allocations within the main memory 114. As described above, the message queue 108 may be sized to accommodate enough messages to allow the process 900 to execute without loss of any memory allocation messages.

The process 900 allows a primary processor, such as the main processor 102, to continue memory allocations in a primary memory, such as the main memory 114, concurrently with the hardware off-load module determining to free primary memory allocations in the primary memory that are represented within a coprocessor memory, such as the coprocessor memory 116. As such, additional received memory allocation messages sent by the main processor 102 during a period of time that the hardware off-load module determines to free the primary memory allocations in the main memory 114 may be processed by a process, such as the process 800 associated with FIG. 8 above, after completion of execution of the process 900. It should further be noted that execution of the process 800 and the process 900 may be interleaved such that the process 800 and the process 900 also run concurrently.

Returning to the description of decision point 902, when a determination is made to begin garbage collection activities, the process 900 makes a determination at decision point 904 as to whether all root-set header elements have been processed. It is noted that the first iteration of the process 900 will result in a negative determination if at least one root-set header element has been allocated previously. It should further be noted that the processing associated with the determination at decision point 904 is performed with respect to root-set headers. As such, when a determination is made at decision point 904 that all header elements have not been processed, the process 900 retrieves a first header element at block 906. At block 908, the process 900 marks the header. As described above, garbage collection management data associated with the respective header element, such as the marked indication, may be used to mark the header. At block 910, the process 900 retrieves pointer metadata associated with the retrieved header element.

At block 912, the process 900 gets the next pointer associated with the retrieved header. At decision point 914, the process 900 makes a determination as to whether all pointers associated with the retrieved header have been processed. When a determination is made that all pointers associated with the retrieved header have not been processed, the process 900 retrieves the header associated with the respective pointer at block 916 using the header metadata associated with the pointer that is being processed. At decision point 918, the process 900 makes a determination as to whether the header is already marked. It should be noted that the retrieved header will not be marked during the first iteration of the process 900, though the retrieved header may already be marked in association with processing during other iterations of the process 900.

When a determination is made at decision point 918 that the header is already marked, the process 900 returns to block 912 and gets the next pointer associated with the header retrieved at block 906 and iterates as described above. When a determination is made at decision point 918 that the header is not already marked, the process 900 saves/pushes the next pointer location onto the stack at block 920 and returns to block 908 to mark the header and iterates as described above.

Returning to the description of decision point 914, when a determination is made that all pointers associated with the retrieved header have been processed, the process 900 makes a determination at decision point 922 as to whether the stack is empty. When a determination is made that the stack is not empty, the process 900 populates the next pointer location at block 924, returns to block 912 to get the next pointer and iterates as described above. When a determination is made that the stack is empty at decision point 922, the process 900 returns to decision point 904 to determine whether all root-set headers have been processed. As such, the process 900 recursively processes all root-set headers and all pointers with header references until all root-set headers have been processed. When a determination is made at decision point 904 that all root-set headers have been processed, the process 900 identifies unused headers (e.g., headers that have not been marked) at block 926. The process 900 sends a free object message to the main processor 102 for each identified unused element at block 928. The process 900 then returns to decision point 902 to await a new garbage collection indication.

As such, the process 900 performs garbage collection activities on behalf of the main processor 102 using the processor memory stack. The process 900 processes allocated header elements and associated pointer metadata to identify all pointers associated with each header element. Each pointer is processed to identify its associated header metadata to further identify additional header elements associated with the respective memory allocations. As such, the process 900 recursively processes root-set headers using pointer metadata and pointers using header metadata, respectively, to perform a mark phase of a garbage collection algorithm. The process 900 also performs the sweep phase to identify all unused elements that were not marked during the mark phase and sends a free object message for each unused element to the main processor 102. The processing described above may be performed, for example, by computing a transitive closure of a reachability graph for allocated objects. Objects that are not found to be part of the transitive closure may be freed since they are not referenced.

As described above in association with FIG. 1 through FIG. 9, the example systems and processes provide hardware off-load memory garbage collection acceleration. Many other variations and additional activities associated with hardware off-load memory garbage collection acceleration are possible and all are considered within the scope of the present subject matter.

Those skilled in the art will recognize, upon consideration of the above teachings, that certain of the above examples are based upon use of a programmed processor, such as the coprocessor 104. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
  receiving, from a primary processor at a hardware memory management coprocessor, a plurality of individual memory allocation messages, where each individual memory allocation message identifies and is received in real time in response to a primary memory allocation in a primary memory made by the primary processor;
  allocating, within a second memory of the hardware memory management coprocessor in response to receiving each individual memory allocation message, a representation of the primary memory allocation identified by the respective received individual memory allocation message, where the hardware memory management coprocessor maintains a real-time memory representation of the primary memory within the second memory;
  determining, based upon the allocated representations of each primary memory allocation within the second memory, to free at least one primary memory allocation in the primary memory of the primary processor; and
  sending, for each of the at least one primary memory allocation in the primary memory to free, an individual memory free message to the primary processor instructing the primary processor to free the primary memory allocation in the primary memory referenced by the respective memory free message.

2. The method of claim 1, where the second memory comprises a memory device identical in size to the primary memory and where allocating, within the second memory of the hardware memory management coprocessor in response to receiving each individual memory allocation message, the representation of the primary memory allocation identified by the respective received individual memory allocation message comprises:
  allocating, for each identified primary memory allocation in the primary memory made by the primary processor in response to receiving each individual memory allocation message, a memory element within the second memory identical in size to the respective identified primary memory allocation in the primary memory made by the primary processor.

3. The method of claim 1, where the second memory comprises a memory device smaller in size than the primary memory and where allocating, within the second memory of the hardware memory management coprocessor in response to receiving each individual memory allocation message, the representation of the primary memory allocation identified by the respective received individual memory allocation message comprises:
  allocating, for each identified primary memory allocation in the primary memory made by the primary processor in response to receiving each individual memory allocation message, a memory allocation header element within the second memory comprising a base address and a size of the respective identified primary memory allocation within the primary memory.

4. The method of claim 3, further comprising:
  receiving a memory pointer update message from the primary processor in response to a pointer initialization performed by the primary processor, where the memory pointer update message comprises a primary memory address associated with one primary memory allocation and a pointer value;
  identifying a memory allocation header element within the second memory with a base address that matches the primary memory address;
  allocating a memory pointer element within the second memory;
  indexing the memory pointer element relative to the memory allocation header element within the second memory; and
  initializing the memory pointer element with the pointer value.

5. The method of claim 4, where indexing the memory pointer element relative to the memory allocation header element within the second memory comprises generating pointer metadata that associates the memory allocation header element with one or more memory pointer elements, where the pointer metadata identifies a storage location of the memory pointer element within the second memory, derived via an associative mapping structure, based upon information within the memory allocation header element.

6. The method of claim 4, where indexing the memory pointer element relative to the memory allocation header element within the second memory comprises generating header metadata that associates the memory pointer element with the memory allocation header element, where the header metadata identifies a storage location of the memory allocation header element within the second memory, derived via one of a hash table and an associative mapping structure, based upon information within the memory pointer element.

7. The method of claim 1, where:
  receiving, from the primary processor at the hardware memory management coprocessor, the plurality of individual memory allocation messages, where each individual memory allocation message identifies and is received in response to the primary memory allocation in the primary memory made by the primary processor comprises receiving each individual memory allocation message from the primary processor via a first uni-directional message queue; and sending, for each of the at least one primary memory allocation in the primary memory to free, the individual memory free message to the primary processor instructing the primary processor to free the primary memory allocation in the primary memory referenced by the respective memory free message comprises sending, for each of the at least one primary memory allocation in the primary memory to free, the individual memory free message to the primary processor via a second unidirectional message queue.

8. The method of claim 1, where determining, based upon the allocated representations of each primary memory allocation within the second memory, to free the at least one primary memory allocation in the primary memory of the primary processor comprises:

executing one of a memory reference counting garbage collection algorithm and a mark and sweep garbage collection algorithm against the allocated representations of each primary memory allocation within the second memory; and determining, based upon the one of the memory reference counting garbage collection algorithm and the mark and sweep garbage collection algorithm executed against the allocated representations of each primary memory allocation within the second memory, to free the at least one primary memory allocation in the primary memory.

9. A system, comprising:

a bi-directional message queue;

a primary processor operatively coupled to a primary memory and the bi-directional message queue; and a hardware memory management coprocessor operatively coupled to a second memory and the bi-directional message queue, and programmed to:

receive, from the primary processor via the bi-directional message queue, a plurality of individual memory allocation messages, where each individual memory allocation message identifies and is received in real time in response to a primary memory allocation in the primary memory made by the primary processor;

allocate, within the second memory in response to receiving each individual memory allocation message, a representation of the primary memory allocation identified by the respective received individual memory allocation message, the hardware memory management coprocessor being programmed to maintain a real-time memory representation of the primary memory within the second memory;

determine, based upon the allocated representations of each primary memory allocation within the second memory, to free at least one primary memory allocation in the primary memory of the primary processor; and send, via the bi-directional message queue for each of the at least one primary memory allocation in the primary memory to free, an individual memory free message to the primary processor instructing the primary processor to free the primary memory allocation in the primary memory referenced by the respective memory free message.

10. The system of claim 9, where the second memory comprises a memory device identical in size to the primary memory and where, in being programmed to allocate, within the second memory in response to receiving each individual memory allocation message, the representation of the primary memory allocation identified by the respective received individual memory allocation message, the hardware memory management coprocessor is programmed to:

allocate, for each identified primary memory allocation in the primary memory made by the primary processor in response to receiving each individual memory allocation message, a memory element within the second memory identical in size to the respective identified primary memory allocation in the primary memory made by the primary processor.

11. The system of claim 9, where the second memory comprises a memory device smaller in size than the primary memory and where, in being programmed to allocate, within the second memory in response to receiving each individual memory allocation message, the representation of the primary memory allocation identified by the respective received individual memory allocation message, the hardware memory management coprocessor is programmed to:

allocate, for each identified primary memory allocation in the primary memory made by the primary processor in response to receiving each individual memory allocation message, a memory allocation header element within the second memory comprising a base address and a size of the respective identified primary memory allocation within the primary memory.

12. The system of claim 11, where the hardware memory management coprocessor is further programmed to:

receive a memory pointer update message from the primary processor in response to a pointer initialization performed by the primary processor, where the memory pointer update message comprises a primary memory address associated with one primary memory allocation and a pointer value;

identify a memory allocation header element within the second memory with a base address that matches the primary memory address;

allocate a memory pointer element within the second memory;

index the memory pointer element relative to the memory allocation header element within the second memory; and initialize the memory pointer element with the pointer value.

13. The system of claim 12, where, in being programmed to index the memory pointer element relative to the memory allocation header element within the second memory, the hardware memory management coprocessor is programmed to generate pointer metadata that associates the memory allocation header element with one or more memory pointer elements, where the pointer metadata identifies a storage location of the memory pointer element within the second memory, derived via an associative mapping structure, based upon information within the memory allocation header element.

14. The system of claim 12, where, in being programmed to index the memory pointer element relative to the memory allocation header element within the second memory, the hardware memory management coprocessor is programmed to generate header metadata that associates the memory pointer element with the memory allocation header element, where the header metadata identifies a storage location of the memory allocation header element within the second memory, derived via one of a hash table and an associative mapping structure, based upon information within the memory pointer element.

15. The system of claim 9, where the bi-directional message queue further comprises a first uni-directional message queue and a second uni-directional message queue, and where:

in being programmed to receive, from the primary processor via the bi-directional message queue, the plurality of individual memory allocation messages, where each individual memory allocation message identifies and is received in response to the primary memory allocation in the primary memory made by the primary processor, the hardware memory management coprocessor is programmed to receive each individual memory allocation message from the primary processor via the first unidirectional message queue; and in being programmed to send, via the bi-directional message queue for each of the at least one primary memory allocation in the primary memory to free, the individual memory free message to the primary processor instructing the primary processor to free the primary memory allocation in the primary memory referenced by the respective memory free message, the hardware memory management coprocessor is programmed to send, for each of the at least one primary memory allocation in the primary memory to free, the individual memory free message to the primary processor via the second unidirectional message queue.

16. The system of claim 9, where, in being programmed to determine, based upon the allocated representations of each primary memory allocation within the second memory, to free the at least one primary memory allocation in the primary memory of the primary processor, the hardware memory management coprocessor is programmed to:
execute one of a memory reference counting garbage collection algorithm and a mark and sweep garbage collection algorithm against the allocated representations of each primary memory allocation within the second memory; and
determine, based upon the one of the memory reference counting garbage collection algorithm and the mark and sweep garbage collection algorithm executed against the allocated representations of each primary memory allocation within the second memory, to free the at least one primary memory allocation in the primary memory.

17. A computer program product comprising a computer readable storage medium including computer readable program code, wherein the computer readable program code when executed on a computer causes the computer to:
receive, from a primary processor at a hardware memory management coprocessor, a plurality of individual memory allocation messages, where each individual memory allocation message identifies and is received in real time in response to a primary memory allocation in a primary memory made by the primary processor;
allocate, within a second memory of the hardware memory management coprocessor in response to receiving each individual memory allocation message, a representation of the primary memory allocation identified by the respective received individual memory allocation message, where the hardware memory management coprocessor maintains a real-time memory representation of the primary memory within the second memory;
determine, based upon the allocated representations of each primary memory allocation within the second memory, to free at least one primary memory allocation in the primary memory of the primary processor; and
send, for each of the at least one primary memory allocation in the primary memory to free, an individual memory free message to the primary processor instructing the primary processor to free the primary memory allocation in the primary memory referenced by the respective memory free message.

18. The computer program product of claim 17, where the second memory comprises a memory device identical in size to the primary memory and where, in causing the computer to allocate, within the second memory of the hardware memory management coprocessor in response to receiving each individual memory allocation message, the representation of the primary memory allocation identified by the respective received individual memory allocation message, the computer readable program code when executed on the computer causes the computer to:
allocate, for each identified primary memory allocation in the primary memory made by the primary processor in response to receiving each individual memory allocation message, a memory element within the second memory identical in size to the respective identified primary memory allocation in the primary memory made by the primary processor.

19. The computer program product of claim 17, where the second memory comprises a memory device smaller in size than the primary memory and where, in causing the computer to allocate, within the second memory of the hardware memory management coprocessor in response to receiving each individual memory allocation message, the representation of the primary memory allocation identified by the respective received individual memory allocation message, the computer readable program code when executed on the computer causes the computer to:
allocate, for each identified primary memory allocation in the primary memory made by the primary processor in response to receiving each individual memory allocation message, a memory allocation header element within the second memory comprising a base address and a size of the respective identified primary memory allocation within the primary memory.

20. The computer program product of claim 19, where the computer readable program code when executed on the computer further causes the computer to:
receive a memory pointer update message from the primary processor in response to a pointer initialization performed by the primary processor, where the memory pointer update message comprises a primary memory address associated with one primary memory allocation and a pointer value;
identify a memory allocation header element within the second memory with a base address that matches the primary memory address;
allocate a memory pointer element within the second memory;
index the memory pointer element relative to the memory allocation header element within the second memory; and
initialize the memory pointer element with the pointer value.

21. The computer program product of claim 20, where, in causing the computer to index the memory pointer element relative to the memory allocation header element within the second memory, the computer readable program code when executed on the computer causes the computer to generate pointer metadata that associates the memory allocation header element with one or more memory pointer elements, where the pointer metadata identifies a storage location of the memory pointer element within the second memory, derived via an associative mapping structure, based upon information within the memory allocation header element.

22. The computer program product of claim 20, where, in causing the computer to index the memory pointer element relative to the memory allocation header element within the second memory, the computer readable program code when executed on the computer causes the computer to generate header metadata that associates the memory pointer element with the memory allocation header element, where the header metadata identifies a storage location of the memory allocation header element within the second memory, derived via one of a hash table and an associative mapping structure, based upon information within the memory pointer element.

23. The computer program product of claim 17, where:
  in causing the computer to receive, from the primary processor at the hardware memory management coprocessor, the plurality of individual memory allocation messages, where each individual memory allocation message identifies and is received in response to the primary memory allocation in the primary memory made by the primary processor, the computer readable program code when executed on the computer causes the computer to receive each individual memory allocation message from the primary processor via a first uni-directional message queue; and
  in causing the computer to send, for each of the at least one primary memory allocation in the primary memory to free, the individual memory free message to the primary processor instructing the primary processor to free the primary memory allocation in the primary memory referenced by the respective memory free message, the computer readable program code when executed on the computer causes the computer to send, for each of the at least one primary memory allocation in the primary memory to free, the individual memory free message to the primary processor via a second uni-directional message queue.

24. The computer program product of claim 17, where, in causing the computer to determine, based upon the allocated representations of each primary memory allocation within the second memory, to free the at least one primary memory allocation in the primary memory of the primary processor, the computer readable program code when executed on the computer causes the computer to:
  execute one of a memory reference counting garbage collection algorithm and a mark and sweep garbage collection algorithm against the allocated representations of each primary memory allocation within the second memory; and
  determine, based upon the one of the memory reference counting garbage collection algorithm and the mark and sweep garbage collection algorithm executed against the allocated representations of each primary memory allocation within the second memory, to free the at least one primary memory allocation in the primary memory.

* * * * *